United States Patent
Hara (10) Patent No.: US 7,675,645 B2
(45) Date of Patent: Mar. 9, 2010

(54) DISPLAYING OBJECT INFORMATION ALONG WITH A PRINT PREVIEW AND OBJECT INFORMATION CHANGING UNIT

(75) Inventor: Shinichiro Hara, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1205 days.

(21) Appl. No.: 10/936,591

(22) Filed: Sep. 9, 2004

(65) Prior Publication Data

US 2005/0174587 A1 Aug. 11, 2005

(30) Foreign Application Priority Data

Feb. 10, 2004 (JP) ............................. 2004-033606

(51) Int. Cl.
*G06K 15/00* (2006.01)
*G06K 15/02* (2006.01)

(52) U.S. Cl. .................. 358/1.18; 358/1.2; 358/1.11

(58) Field of Classification Search ............... 358/1.15, 358/1.13, 1.18, 1.1, 1.9, 1.2, 1.14, 1.16, 1.17, 358/1.5, 1.6, 2.1, 2.99, 1.11, 537, 538, 540, 358/452, 453, 462; 715/274, 273, 275, 276, 715/200, 211; 382/289, 290, 291, 292, 293, 382/298, 299, 300, 301
See application file for complete search history.

(56) References Cited

U.S. PATENT DOCUMENTS 6,101,513 A * 8/2000 Shakib et al. ............... 715/234
6,661,530 B1 * 12/2003 Munetomo et al. .......... 358/1.15
6,701,011 B1 * 3/2004 Nakajima ................... 382/167
7,085,006 B2 * 8/2006 Yokoyama et al. ........... 358/1.9

FOREIGN PATENT DOCUMENTS

| JP | A-9-231039 | 9/1997 |
|----|------------|--------|
| JP | A 2000-339121 | 12/2000 |
| JP | A 2002-91729 | 3/2002 |

* cited by examiner

*Primary Examiner*—Dov Popovici
(74) *Attorney, Agent, or Firm*—Oliff & Berridge, PLC (57) ABSTRACT

A print control apparatus carrying out a print control processing for print data undergoing a print processing in a print apparatus includes a receiving unit that receives print data; a processing unit that carries out image processing for the received print data, thereby generating image data; an image data analyzing unit that analyzes at least one draw object in the generated image data; a display control unit that displays object information relating to the draw object analyzed by the image data analyzing unit on a display unit; an object information change instruction receiving unit that receives a change instruction for the object information; an object information changing unit that changes object information relating to the draw object according to the change instruction for the object information received by the object information change instruction receiving unit; and a storage unit that stores image data and object information.

18 Claims, 7 Drawing Sheets

DISPLAYING OBJECT INFORMATION ALONG WITH A PRINT PREVIEW AND OBJECT INFORMATION CHANGING UNIT

FIELD OF THE INVENTION

The present invention relates to a print control apparatus, a print control method, and a program for print control, and more particularly to a print control apparatus, a print control method, and a program for print control in which print data that undergoes print processing is displayed as a print preview.

BACKGROUND OF THE INVENTION

Functions of a printer driver have become abundant recently, and consequently, there is such a problem that users have difficulty in obtaining a precise predicted image of an actual output result of a document to be printed and selecting an optimal print mode based on the predicted image of the actual output result.

To solve the above problem, there is provided a printer driver that displays a print preview on a host PC for a review of a print result before actual printing on recording paper (see Japanese patent application publication no. 2000-339121, for example).

Further, although image quality modes for setting a print quality have also become rich, there is such a problem that because a document to be printed contains various types of objects (such as character, graphic, and bitmap), it is difficult to print every objects with respective optimal qualities.

To solve the above problem, for example, there are provided a print control apparatus, a print control method for the print control apparatus, and a printing medium, which analyzes image data before printing operations, and displays an image quality setting menu in which an optimal recording method is automatically set (see Japanese patent application publication no. 2002-91729, for example).

However, the techniques described in Japanese patent application publication no. 2000-339121 and Japanese patent application publication no. 2002-91729 have such a problem that if a document contains a mixture of various objects of different types, it is difficult to select an optimal image quality mode for the respective objects.

Further, there is such a problem that some application program may treat a character object as a bitmap object, and issue print instructions accordingly. On that occasion, the character object undergoes image processing as bitmap object, and consequently is not output clearly.

SUMMARY OF THE INVENTION

The present invention has been made in view of the above circumstances and provides a print control apparatus, a print control method, and a program for print control capable of attaining optimal image quality setting to respective objects.

According to an aspect of the present invention, a print control apparatus carrying out print control processing for print data undergoing print processing on a print apparatus comprising print data receiving unit for receiving the print data, print data processing unit for carrying out image processing for the print data received by the print data receiving unit, thereby generating image data, image data analyzing unit for analyzing at least one draw object in the image data generated by the print data processing unit, display control unit for displaying object information relating to the draw object analyzed by the image data analyzing unit on display unit, object information change instruction receiving unit for receiving a change instruction intended for the object information, object information changing unit for changing the object information relating to the draw object according to the change instruction intended for the object information received by the object information change instruction receiving unit, and storage unit for storing and maintaining the image data and the object information.

According to the present invention, the image quality setting can be changed for each actual objects to be printed, and thus, even if one document contains a mixture of various objects, or even if an application fails in treating objects, optimal image quality setting is possible, and further, editing of each object such as thickening only specific lines is also possible.

BRIEF DESCRIPTION OF THE DRAWINGS

Embodiment of the present invention will be described in detail base on the following drawings, wherein.

DESCRIPTION OF THE EMBODIMENTS

A detailed description will now be given of an embodiment of the present invention with reference to the accompanying drawings.

By way of an example, the description will be given of a configuration where an information processing apparatus such as a PC (Personal Computer) and a print apparatus are connected with each other over a network, and a printer driver having a print control processing function is installed on the information processing apparatus.

In the following description, "print data" is defined as such data as in documents, drawings, and images that are input to the printer driver from an application program in the information processing apparatus, and "print job" is defined as data created by the printer driver based on the print data, and is output to the print apparatus. The print job includes image data undergoing print processing on the print apparatus (such as information described in PDL [Page Description Language]), and control data used for control of the print processing.

Figure 1:
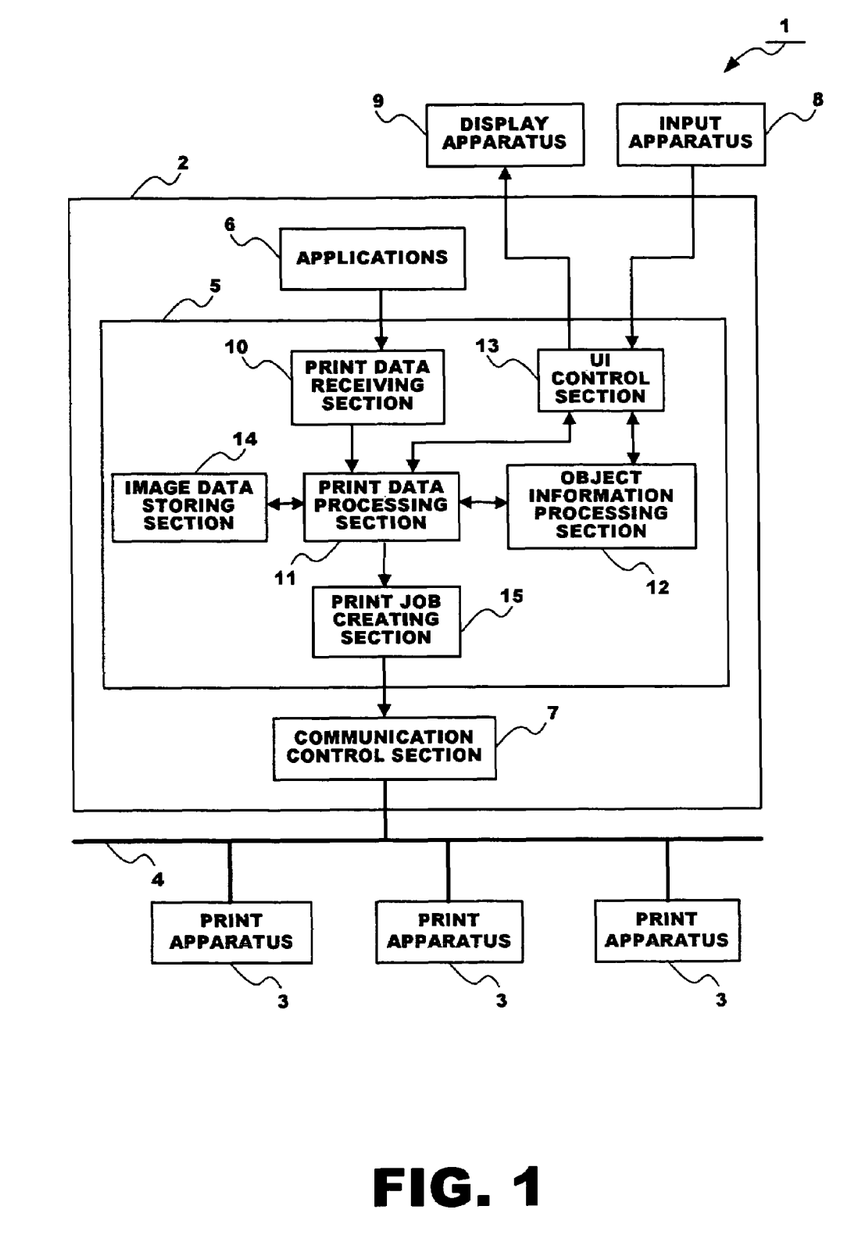
FIG. 1 is a block diagram illustrating an example of an overall configuration of a print system used with an embodiment of the present invention.

FIG. 1 is a block diagram illustrating an example of an overall configuration of a print system 1 used with the embodiment of the present invention.

As shown in FIG. 1, the print system 1 comprises an information processing apparatus 2 and print apparatuses 3 connected with each other over a network 4, and a printer driver 5 is installed on the information processing apparatus 2.

The information processing apparatus 2 comprises various types of applications 6 realized by the application programs, and a communication control section 7 carrying out processing for the reception/transmission of data through the network 4. These components carry out different types of processing by using functions of an OS (Operating System), not shown, under the control of the OS. In addition, an input apparatus 8 such as a keyboard or a mouse, and a display apparatus 9 such as a display unit are connected to the information processing apparatus 2. It should be noted that configurations other than the configuration relating to the print processing described above are not shown in this figure, and thus, a description thereof is omitted.

A detailed description will now be given of a functional configuration of the printer driver 5.

As shown in FIG. 1, the printer driver 5 comprises a print data receiving section 10, a print data processing section 11, an object information processing section 12, a UI control section 13, an image data storing section 14, and a print job creating section 15.

A detailed description will now be given of the respective components.

The print data receiving section 10 carries out a process of receiving print data from the application 6.

The print data processing section 11 carries out a drawing process for the print data received by the print data receiving section 10, thereby generating the image data. If the print data processing section 11 receives instructions on changing object information from the object information processing section 12, the print data processing section 11 carries out a process of changing the object information in the image data.

The object information processing section 12 carries out a process which analyzes and changes object information relating to the objects in the image data generated by the print data processing section 11.

The UI control section 13 carries out a process of display control of a print property screen which is a printer driver UI (User Interface) displayed on the display apparatus 9, and a process of receiving the instructions or selections of a user input from the input apparatus 8.

The image data storing section 14 stores the image data generated by the print data processing section 11 as well as the object information in the image data.

The print job creating section 15 creates a print job based on the image data generated by the print data processing section 11.

Figure 2:
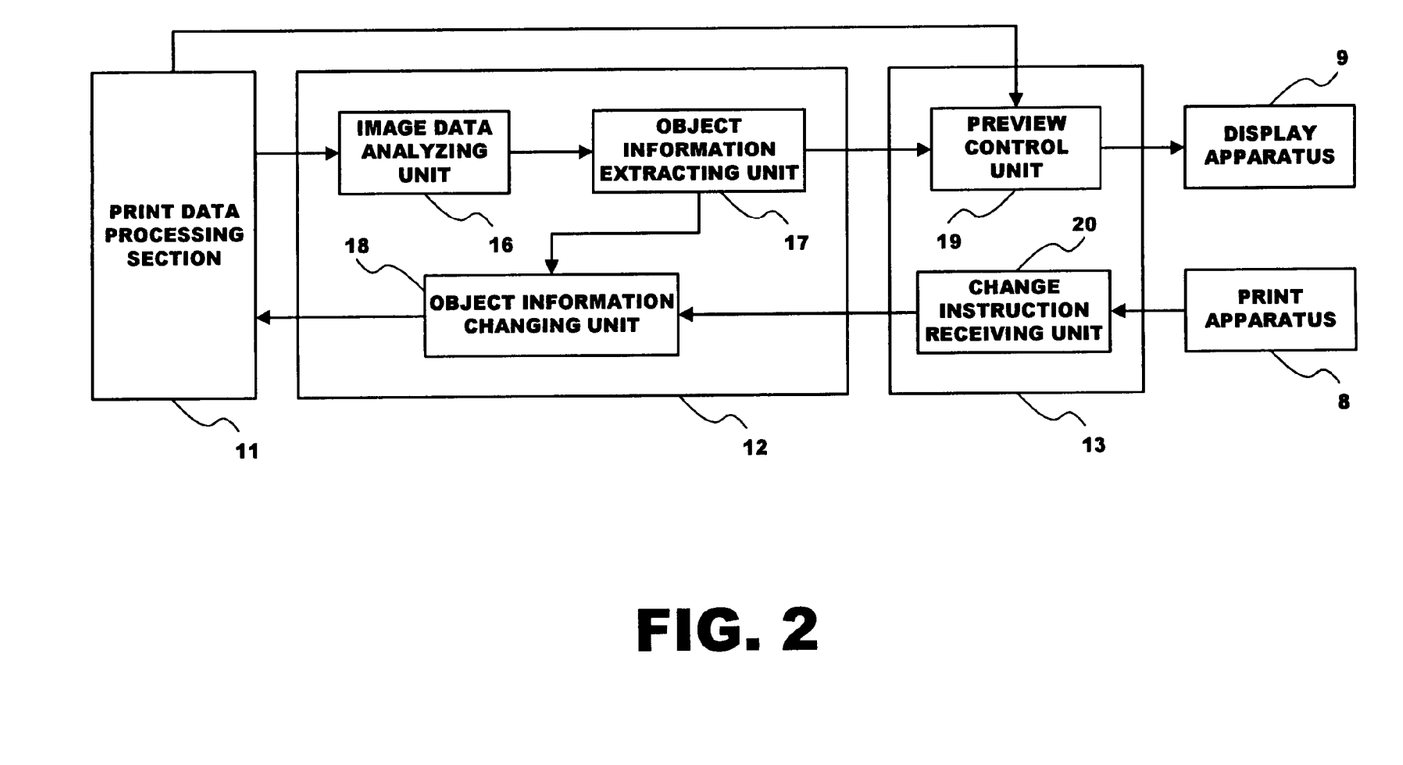
FIG. 2 is a block diagram illustrating an example of a functional configuration of an object information processing section and a UI control section.

FIG. 2 is a block diagram illustrating an example of a functional configuration of the object information processing section 12 and the UI control section 13.

A detailed description will now be given of the functional configuration of the object information processing section 12.

As shown in FIG. 2, the object information processing section 12 comprises an image data analyzing unit 16, an object information extracting unit 17, and an object information changing unit 18 as functions thereof.

The image data analyzing unit 16 analyzes the object information relating to the objects in the image data generated by the print data processing section 11. The object information includes types of an object (text, image, or graphics), and attributes of the object types.

The object information extracting unit 17 carries out an extraction of the object information in the image data analyzed by the image data analyzing unit 16.

When the input apparatus 8 receives a change instruction of the object information in the image data, the object information changing unit 18 carries out a change of the object information in the image data according to the received change instruction.

A detailed description will now be given of the functional configuration of the UI control section 13.

As shown in FIG. 2, the UI control section 13 comprises a preview control unit 19 and a change instruction receiving unit 20 as functions thereof.

The preview control unit 19 carries out a preview of the image data generated by the print data processing section 11, and a display of the object information in the image data extracted by the object information extracting unit 17 of the object information processing section 12 on the display apparatus 9.

The change instruction receiving unit 20 carries out a reception of the change instruction of the object information input from the input apparatus 8.

A detailed description will now be given of an example of functional operations of the printer driver 5 with reference to FIG. 1 and FIG. 2.

When the print data receiving section 10 receives the print data from the application 6, the print data receiving section 10 sends out the received print data to the print data processing section 11. When the print data processing section 11 receives the print data, the print data processing section 11 carries out the drawing process for the received print data, thereby generating the image data.

On this occasion, when the display of the print preview of the image data is requested, the preview control unit 19 extracts the image data from the print data processing section 11, generates the preview of the extracted image data, and shows the generated preview of the image data on the display apparatus 9. Further, the image data analyzing unit 16 analyzes the object information relating to the objects in the image data in the print data processing section 11. The object information extracting unit 17 extracts the object information from the image data analyzed by the image data analyzing unit 16, and sends out the extracted object information to the preview control unit 19. When the preview control unit 19 receives the object information, the preview control unit 19 temporarily maintains the received object information.

On this occasion, when the display of the object information is requested, the preview control unit 19 displays the object information whose display is requested on the display apparatus 9.

On this occasion, when the change instruction for the object information displayed on the display apparatus 9 is input from the input apparatus 8, and the change instruction receiving unit 20 receives the change instruction for the object information, the change instruction receiving unit 20 sends out the received change instruction for the object information to the object information changing unit 18. When the object information changing unit 18 receives the change instruction for the object information, the object information changing unit 18 changes the object information in the image data according to the received change instruction for the object information.

On this occasion, when the UI control section 13 receives a print instruction from the input apparatus 8, the UI control section 13 notifies the print data processing section 11 of the print instruction. When the print data processing section 11 receives the print instruction, the print data processing section 11 sends out the image data to the print job creating section 15. When the print job creating section 15 receives the image data, the print job creating section 15 creates the print job based on the received image data. The communication control section 7 transmits the print job created by the print job creating section 15 to the print apparatus 3.

Figure 3:
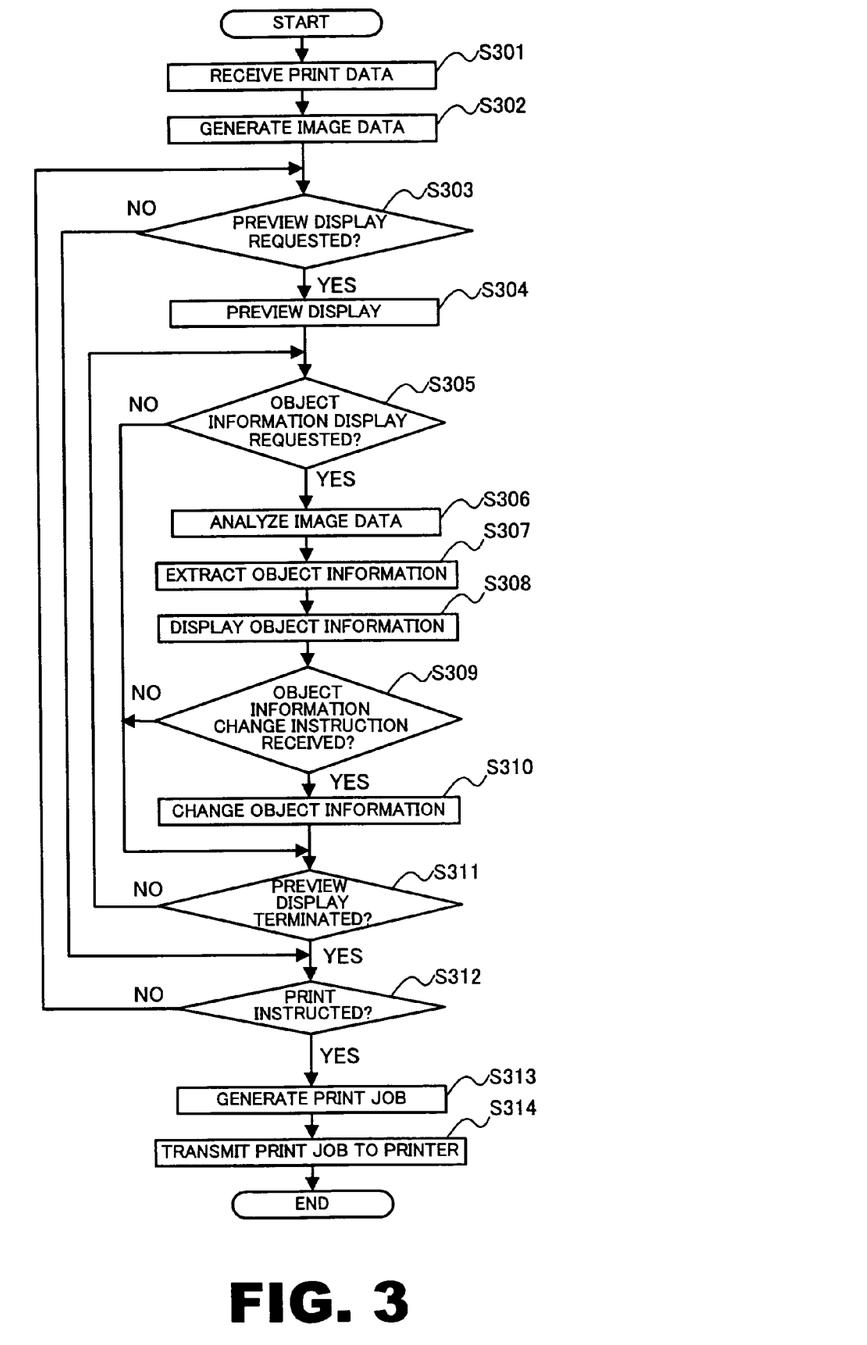
FIG. 3 is a flowchart illustrating print control processing and change processing of object information in image data carried out by a printer driver.

A description will now be given of the print control processing and the change processing of the object information in the image data carried out by the printer driver 5 with reference to a flowchart shown in FIG. 3.

When a print data is received (step S301), an image data is generated based on the received print data (step S302). When the preview display of the generated image data is requested ("YES" in a step S303), the preview display of the image data is carried out (step S304). When the display of the object information in the displayed image data is requested ("YES" in a step S305), the image data is analyzed (step S306), the object information is extracted from the image data (step S307), and the extracted object information is displayed (step S308). When the change instruction intended for the displayed object information is received ("YES" in a step S309), the object information is changed according to the received change instruction (S310). When the preview display is terminated ("YES" in a step S311), and the print is instructed ("YES" in a step S312), the print job is created (step S313). The created print job is transmitted to the print apparatus (S314). Finally, the print control processing and the change processing of the object information in the image data are terminated.

A detailed description will now be given of the change processing of the object information in the image data with reference to specific examples.

Figure 4:
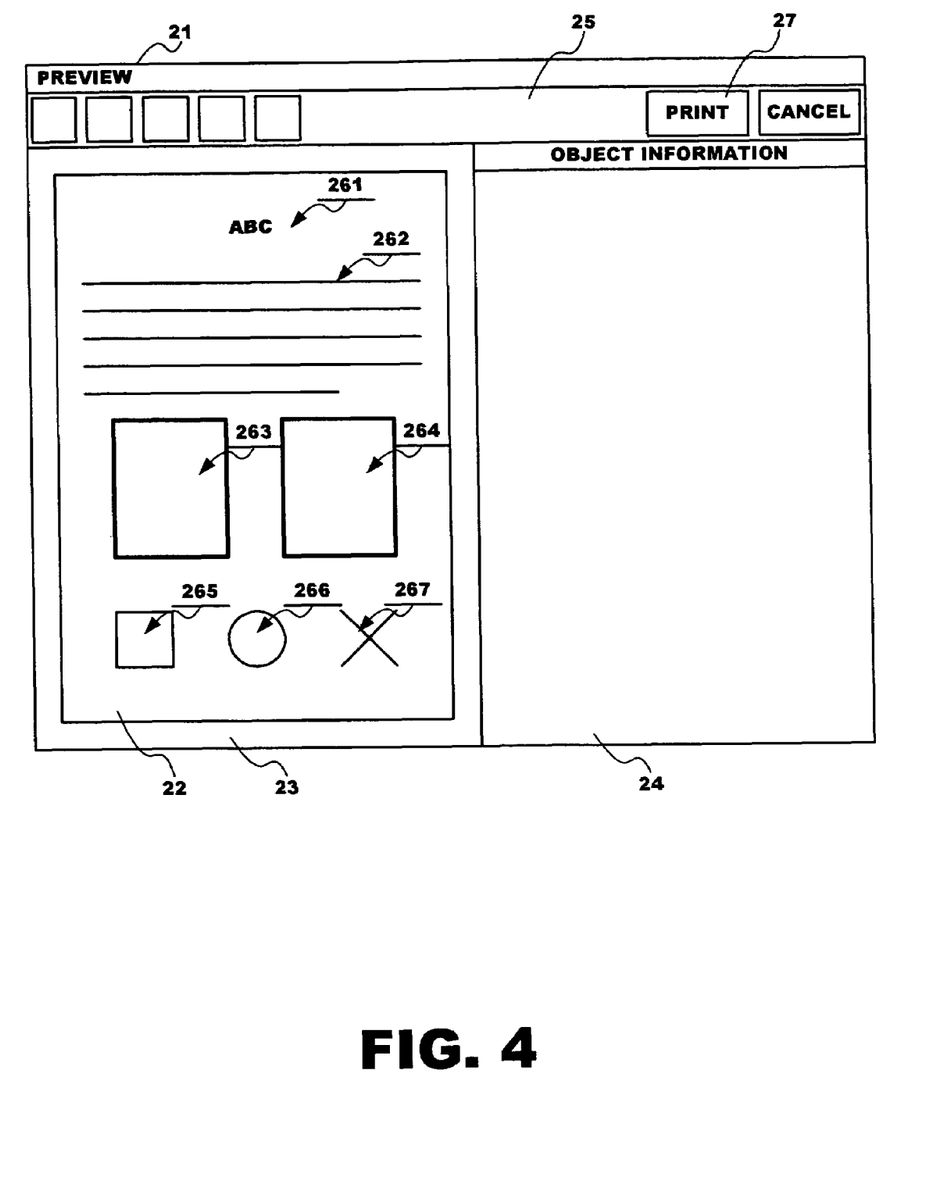
FIG. 4 shows an example of a preview screen.

FIG. 4 shows an example of a preview screen 21.

As shown in FIG. 4, the preview screen 21 is constituted by a preview display area 23 for displaying a preview 22 of the image data, an object information display area 24 for displaying the object information on a selected object in the preview display area 23, and a toolbar 25 on which icon buttons are arranged.

In the preview screen 21, the preview 22 of the image data is shown on the preview display area 23, and multiple objects (objects A to G) are included in the image data. On this occasion, the object type of the object A 261, the object C 263, and the object D 264 is the image type. The object type of the object B 262 is the text type. The object type of the object E 265, the object F 266, and the object G 267 is the graphic type.

When a "Print" button 27 on the toolbar is clicked, the print of the image data is started.

Figure 5:
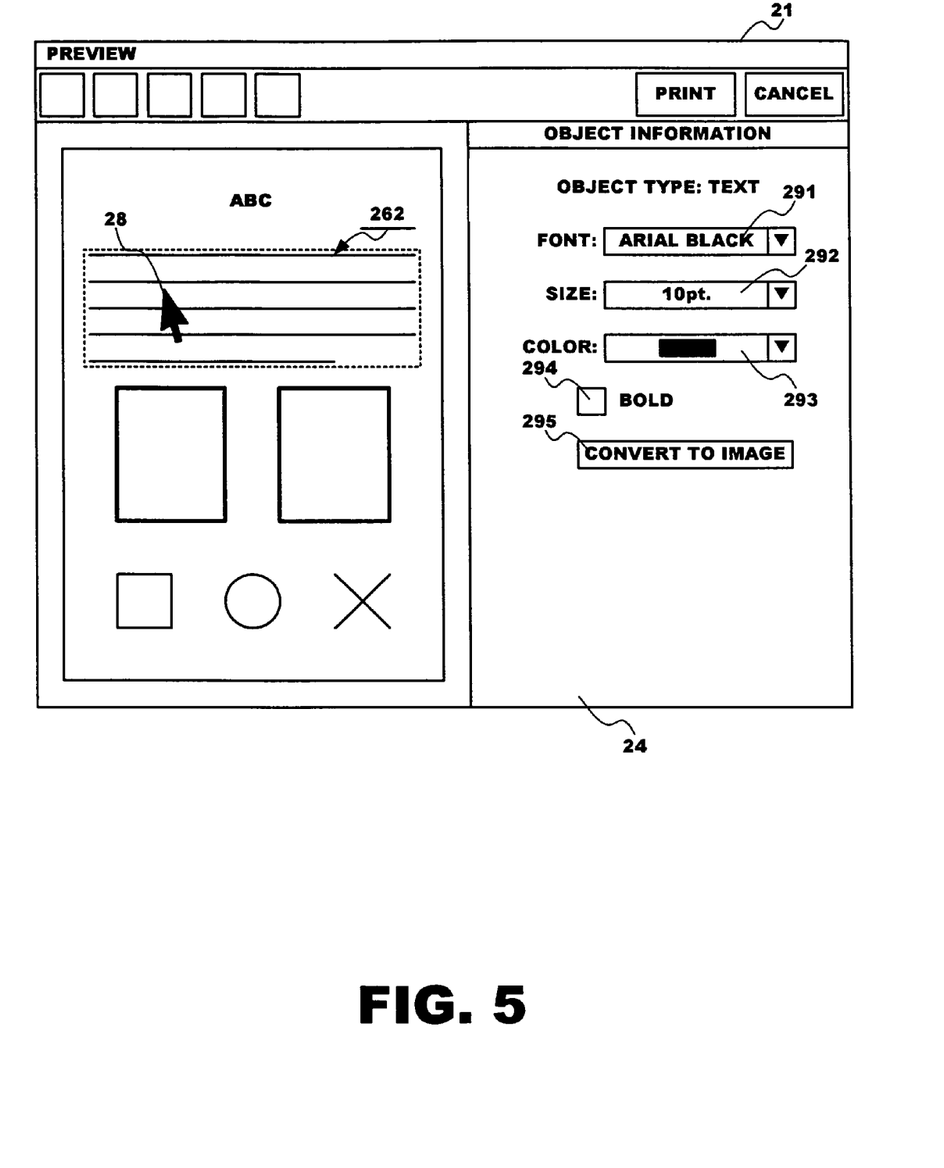
FIG. 5 shows an example of a preview screen illustrating object information on an object.

FIG. 5 shows an example of the preview screen 21 illustrating the object information on the object B 262.

As shown in FIG. 5, when the object B 262 is selected by a pointer 28, the object information on the object B 262 is displayed on the object information display area 24. On this occasion, the object information display area 24 displays, as the object information on the object B 262, a type of the object, and a font, a size, and a color as the attributes of the object type. It should be noted that the object information is not limited to that shown in FIG. 5.

When a desired font is selected from multiple options shown in a "Font" combobox 291, the font of the object B 262 is changed. Further, selecting a desired size from multiple options shown in a "Size" combobox 292 allows to change the size of the object B 262, selecting a desired color from multiple options shown in a "Color" combobox 293 allows to change the color of the object B 262, selecting a "Bold" check box 294 allows to make the object B 262 bold, and clicking a "Convert to Image" button 295 allows to convert the object B 262 into an image.

Figure 6A:
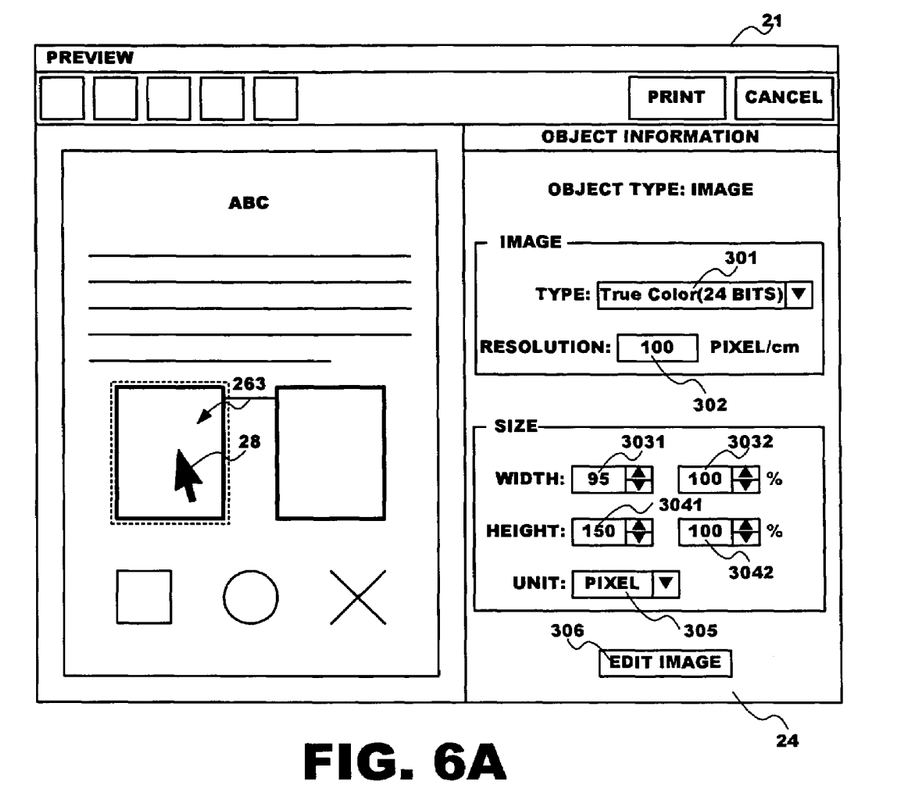
FIGS. 6A and 6B show an example of a preview screen illustrating object information on another object.
Figure 6B:
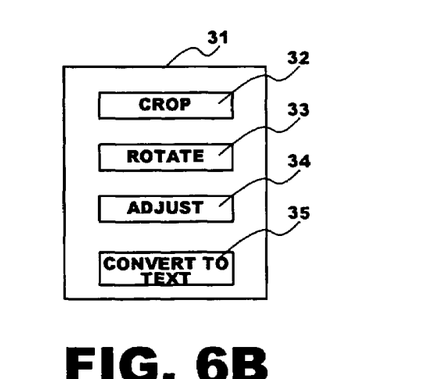

FIG. 6 shows an example of the preview screen 21 illustrating the object information on the object C 263.

As shown in FIG. 6A, when the object C 263 is selected by the pointer 28, the object information on the object C 263 is displayed on the object information display area 24. The object information display area 24 displays, as the object information on the object C 263, the object type, and a type of an image, a resolution of the image, a width and a height in the size as attributes of the object type. It should be noted that the object information is not limited to that shown in FIG. 6A.

When a desired type of the image is selected from multiple options shown in a "Type" combobox 301 in an "Image" section, the type of the image of the object C 263 is changed. Further, entering a desired resolution of the image in a "Resolution" text box 302 in the "Image" section allows to change the resolution of the image of the object C 263, entering a desired value of the width of the size in a "Width" spin box 3031 in a "Size" section (or entering a desired scale of the width in a spin box 3032 in the "Size" section) allows to change the width of the size of the object C 263, entering a desired value of the height of the size in a "Height" spin box 3041 in the "Size" section (or entering a desired scale of the height in a spin box 3042 in the "Size" section) allows to change the height of the size of the object C 263, and selecting a desired unit of the size from multiple options shown in a "Unit" combobox 305 in the "Size" section allows to change the unit of the size of the object C 263.

In addition, by clicking an "Edit Image" button 306, an image editing window 31 is displayed as shown in FIG. 6B.

On this occasion, when a "Crop" button 32 in the image editing window 31 is clicked, cropping processing of the object C 263 is carried out. Further, clicking a "Rotate" button 33 allows to carry out rotation processing of the object C 263, and clicking an "Adjust" button 34 allows to carry out adjusting processing of the object C 263.

By clicking a "Convert to Text" button 35 in the image editing window 31, characters on the image is converted to a text by using an OCR (Optical Character Recognition) function.

Figure 7:
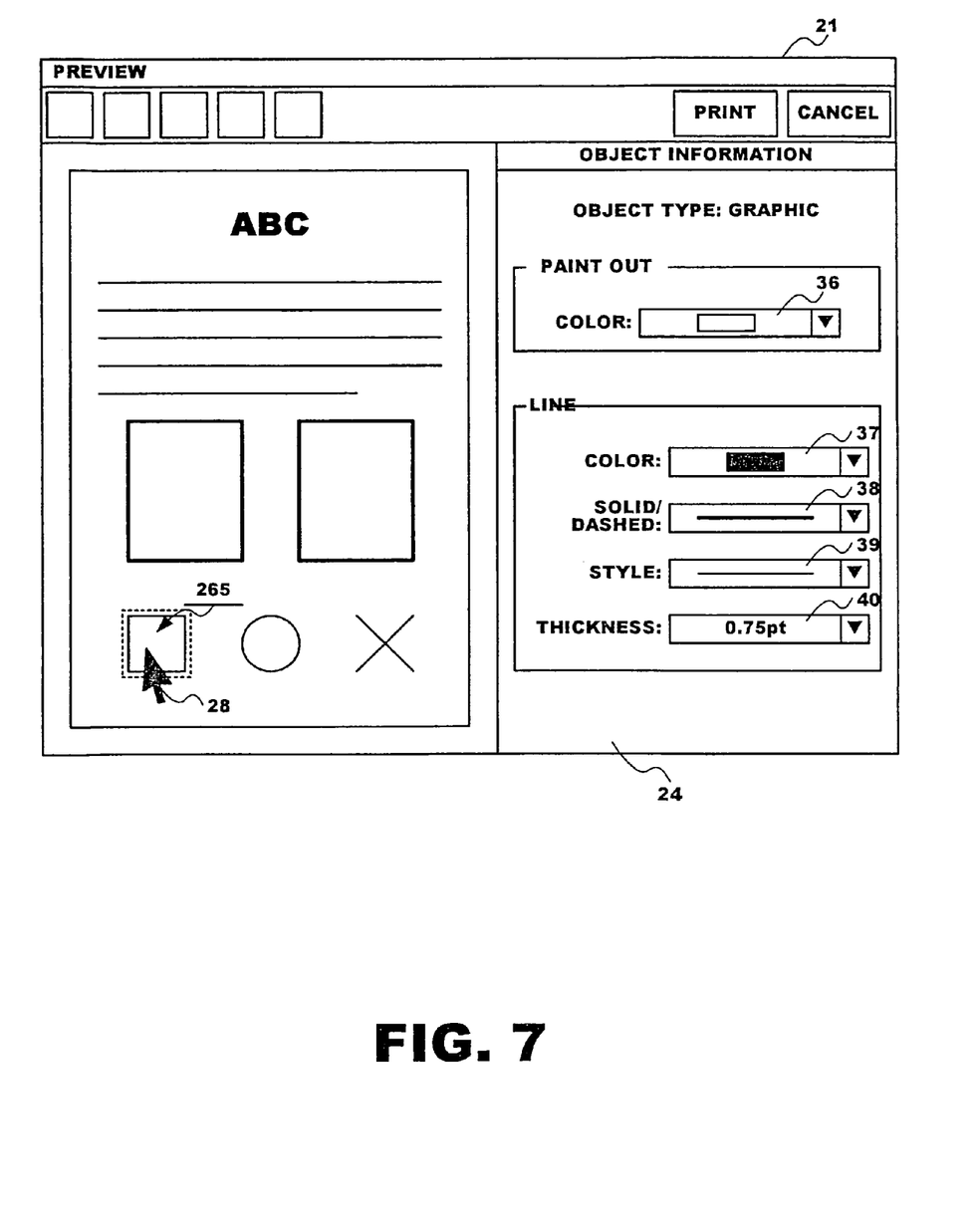
FIG. 7 shows an example of a preview screen illustrating object information on still another object.

FIG. 7 shows an example of the preview screen 21 illustrating the object information on the object E 265.

As shown in FIG. 7, when the object E 265 is selected by using the pointer 28, the object information on the object E 265 is displayed on the object information display area 24. On this occasion, the object information display area 24 display, as the object information on the object E 265, the object type, and a color for painting out, a color of a line, a solid/dashed of line, a style, and a thickness as the attributes of the object type. It should be noted that the object information is not limited to that shown in FIG. 7.

On this occasion, when a desired color of the painting out is selected from multiple options shown in a "Color" combobox 36 in a "Paint out" section, the color of the painting out the object E 265 is changed. Further, selecting a desired color of the line from multiple options shown in a "Color" combobox 37 in a "Line" section allows to change the color of the line of the object E 265, selecting a desired solid/dashed line pattern from multiple options shown in a "Solid/Dashed" combobox 38 in the "Line" section allows to change the solid/dashed line pattern of the object E 265, and selecting a desired style of the line from multiple options shown in a "Style" combobox 39 in the "Line" section allows to change the style of the line of the object E 265, and selecting a desired thickness of the line from multiple options shown in a "Thickness" combobox 40 in the "Line" section allows to change the thickness of the line of the object E 265.

It should be noted that it is possible to employ a configuration in which draw information (such as colors of a pen and a brush) is an attribute of the object type.

Further, it is possible to employ a configuration in which an object to be printed is designated through the preview screen 21. For example, by selecting the object A 261, the object D 264, the object F 266, and the object G 267, it is possible to print only the object A 261, the object D 264, the object F 266, and the object G 267.

Furthermore, when a trouble occurs in printing the image data due to the change of the object information, it is possible to employ a configuration in which warning is issued for the trouble. For example, when changing a line in the image data to a thinner line, and carrying out a 2-up print would cause such a trouble that the thinner line would not be printed, a configuration may be employed in which a warning for the trouble is displayed on the preview screen 21.

The present invention is not limited to the configuration as in the embodiment described above in which the printer driver 5 is installed on the information processing apparatus 2. The present invention is also applicable to configurations in which the information processing apparatus 2 incorporates or is connected to a print control apparatus having the same functions as the printer driver 5 as described above.

What is claimed is:

1. A print control apparatus carrying out a print control processing for print data relating to a document including objects embedded therein and undergoing a print processing in a print apparatus, comprising:
    a print data receiving unit that receives the print data;
    a print data processing unit that carries out image processing for the print data received by the print data receiving unit, thereby generating image data;
    an image data analyzing unit that analyzes draw objects in the image data generated by the print data processing unit;
    an object information extracting unit that extracts object information relating to each of the draw objects analyzed by the image data analyzing unit, wherein the object information includes image quality settings of the document;
    a display control unit displaying the object information relating to each draw object extracted by the object information extracting unit on a display unit;
    an object information change instruction receiving unit receiving a separate change instruction for the object information for each of the respective draw objects;
    an object information changing unit that changes the image quality settings relating to the respective draw objects according to the separate change instruction for the object information for each of the respective draw objects received by the object information change instruction receiving unit; and
    a storage unit that stores and maintains the image data and the object information.

2. The print control apparatus according to claim 1, wherein the display control unit displays the object information along with a print preview of the image data on the display unit.

3. The print control apparatus according to claim 1, wherein the object information analyzed by the image data analyzing unit concerns type of the draw object, font, size, color, thickness, and resolution.

4. The print control apparatus according to claim 3, wherein
    the type of the draw object includes text, image, and graphics; and
    if the type of the draw object is image, the object information changing unit carries out character recognition on the image, and converts a character recognized as a result of the character recognition into a draw object in text.

5. The print control apparatus according to claim 1, wherein the object information changing unit sets as to whether the draw object undergoes the print processing by the print apparatus or not.

6. The print control apparatus according to claim 1, wherein, when the object information is changed, the object information changing unit warns of a generation of a trouble in printing of the image data if the change of the object information causes the trouble.

7. A print control method carrying out print control processing for print data relating to a document including objects embedded therein and undergoing print processing in a print apparatus, comprising:
    receiving the print data;
    carrying out image processing for the received print data, thereby generating image data;
    analyzing draw objects in the generated image data;
    extracting object information relating to each of the analyzed draw objects, wherein the object information includes image quality settings of the document;
    displaying object information relating to each of the extracted object information relating to each of the analyzed draw objects on a display apparatus;
    changing the image quality settings of individual draw objects according to a separate change instruction for the object information relating to an individual draw object when the separate change instruction for the object information for an individual draw object is received; and
    storing and maintaining the image data and the object information.

8. The print control method according to claim 7, wherein the object information is displayed along with a print preview of the image data on the display apparatus.

9. The print control method according to claim 7, wherein the object information concerns type of the draw object, font, size, color, thickness, and resolution.

10. The print control method according to claim 9, wherein:
    the type of the draw object includes text, image, and graphics; and
    if the type of the draw object is image when the object information is changed, character recognition is carried out on the image, and a character recognized as a result of the character recognition is converted to a draw object in text.

11. The print control method according to claim 7, wherein whether or not the draw object undergoes the print processing by the print apparatus is set when the object information is changed.

12. The print control method according to claim 7, wherein, when the object information is changed, a generation of a trouble in printing of the image data is warned if the change of the object information causes the trouble.

13. A computer readable recording medium storing a computer program causing a computer to execute a process for print control processing and performing print processing in a print apparatus, the process comprising:
    receiving print data relating to a document;
    carrying out image processing for the received print data, thereby generating image data;
    analyzing draw objects in the generated image data;
    extracting object information relating to each of the analyzed draw objects, wherein the object information includes image quality settings of the document;

displaying object information relating to each of the extracted object information relating to each of the analyzed draw objects on a display apparatus;

changing the image quality settings of individual draw objects according to a separate change instruction for the object information relating to an individual draw object when the separate change instruction for the object information for the individual draw object is received; and storing and maintaining the image data and the object information.

14. The computer readable recording medium according to claim 13, wherein the computer is caused to execute a process for displaying the object information along with a print preview of the image data on the display apparatus.

15. The computer readable recording medium according to claim 13, wherein the object information concerns type of the draw object, font, size, color, thickness, and resolution.

16. The computer readable recording medium according to claim 15, wherein:

the type of the draw object includes text, image, and graphics; and if the type of the draw object is image when the object information is changed, the computer is caused to execute a process for carrying out character recognition on the image, and converting a character recognized as a result of the character recognition to a draw object in text.

17. The computer readable recording medium according to claim 13, wherein the computer is caused to execute a process of setting whether or not the draw object undergoes the print processing by the print apparatus when the object information is changed.

18. The computer readable recording medium according to claim 13, wherein, when the object information is changed, the computer is caused to execute a process for warning of a generation of the trouble in printing of the image data if the change of the object information causes the trouble.

* * * * *